United States Patent [19]

Scholz et al.

[11] Patent Number: 4,871,923
[45] Date of Patent: Oct. 3, 1989

[54] WIND POWER DEVICE

[76] Inventors: Hans-Ulrich Scholz, Fichtenweg 15; Heinz-Konrad Proeve, Rudolf-Virchow-Strasse Z, both of 3100 Celle, Fed. Rep. of Germany

[21] Appl. No.: 79,837

[22] Filed: Jul. 30, 1987

[30] Foreign Application Priority Data

Jul. 30, 1986 [DE] Fed. Rep. of Germany ....... 3625840

[51] Int. Cl.$^4$ .............................................. F03D 1/06
[52] U.S. Cl. .......................................... 290/55; 290/44
[58] Field of Search ................................... 290/44, 55

[56] References Cited

U.S. PATENT DOCUMENTS

| 2,491,172 | 12/1949 | Forsyth | 290/55 |
| 2,655,604 | 10/1953 | Hutter | 290/55 |
| 4,292,540 | 9/1981 | Thompson et al. | 290/44 |
| 4,350,898 | 9/1982 | Benoit | 290/44 |
| 4,692,631 | 9/1987 | Dahl | 290/55 |

FOREIGN PATENT DOCUMENTS 3012069 8/1981 Fed. Rep. of Germany .
3031390 2/1982 Fed. Rep. of Germany .

Primary Examiner—Bernard Roskoski
Attorney, Agent, or Firm—Michael J. Striker

[57] ABSTRACT

A wind power device comprises a rotor, a machine for converting wind energy, a transmission for transmitting a rotary movement of the rotor to the machine, a tower formed so that the rotor, the transmission and the machine are arranged on the tower, a housing accommodating the transmission and the machine, the rotor having a hub which is formed substantially as a circular ring and also having a plurality of blades which are arranged substantially centrally of the hub, and a bearing unit including at least two bearing members arranged symmetrically at both sides of the rotor wings as considered in an axial direction and supporting the hub on the housing.

20 Claims, 6 Drawing Sheets

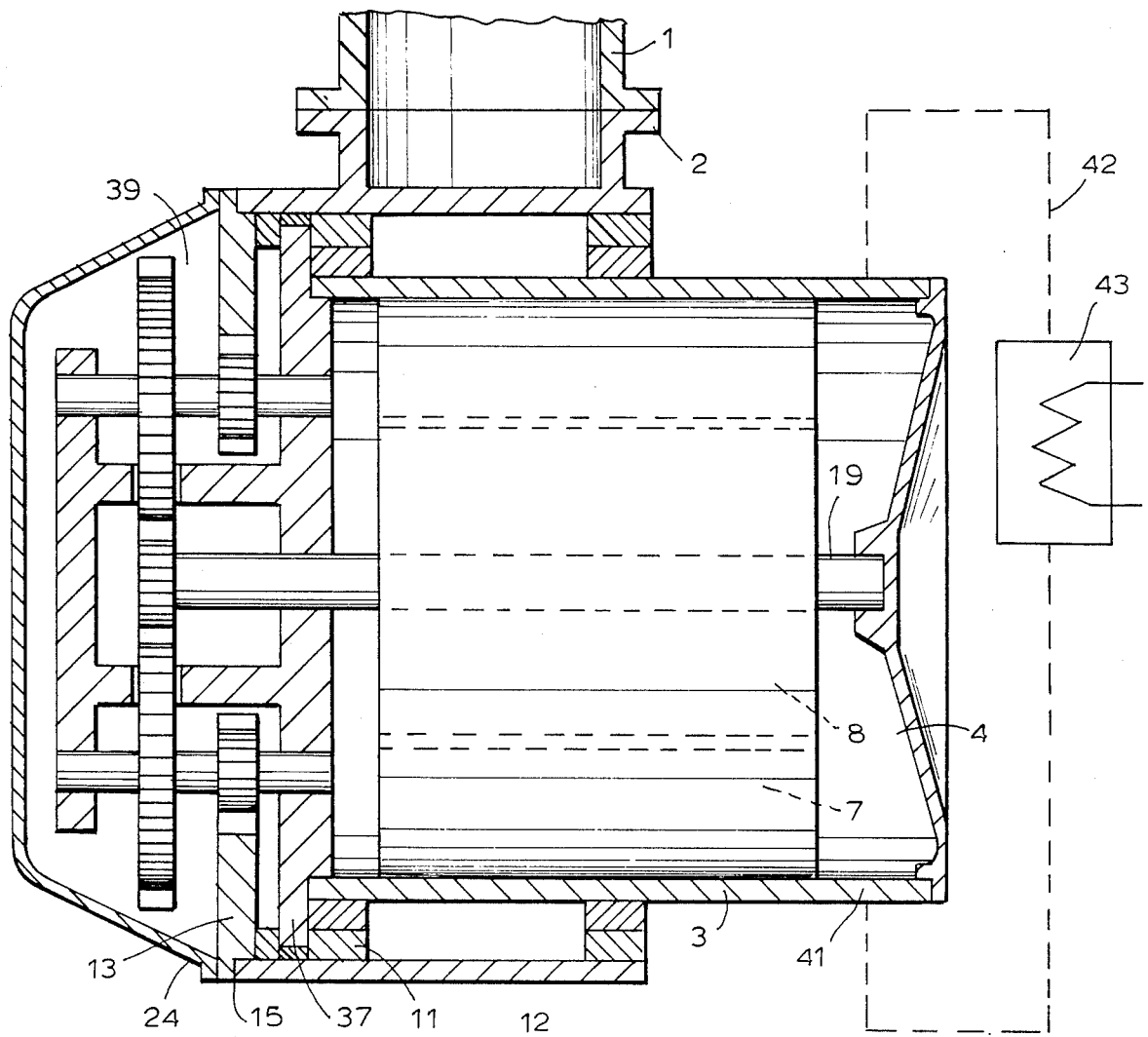
F I G. 3

WIND POWER DEVICE

BACKGROUND OF THE INVENTION

The present invention relates to wind power devices.

In wind power devices it is basically known to arrange a transmission, a machine which works for example as a generator, and a rotor as individual elements on a common frame which is turnable about a substantially vertical axis on a tower (tarret) support for bringing the rotor always in favorable orientation relative to the wind direction. A braking device is arranged on the above mentioned frame and can stop the rotor when needed. The support of the rotor shaft is formed by a horizontal bearing, and couplings are provided between the remaining operational elements of the system located on the frame, namely the gearbox and the generator.

The whole arrangement which is located on the frame is protected by a protective hood from weather conditions. A maintenance platform is further provided on the whole arrangement and serves for required maintenance works in a secured position. This is required since the above mentioned frame is located at a relatively great height over the ground in correspondence with the dimensions of the tower.

The above described arrangement of the wind power devices provides for the advantage that the operational elements located on the frame can be formed as conventional standard parts which can be exchanged when needed in a fast and simple manner. The disadvantage of this arrangement is, however, the relatively great structural volumes and relatively heavy construction which is required partially by the overmounted bearing of the rotor shaft. The numerous bearing points on the frame as well as the coupling aggregates form numerous points which have to be maintained and also have problematic accessibility which require maintenance platform. As a result of this, maintenance works with this arrangement are not only expensive but also must provide additional features which increase the mass of the system supported on the tower bearing. The known system is also not favorable with respect to mounting, since the provision of numerous individual aggregates requires adjustment works. Finally, the great number of individual aggregates also negatively affects the efficiency of the whole system.

The German document DE-OS No. 3,031,390 shows a wind power device with a rotor which is also arranged in overmounted manner. Here a housing which accommodates the transmission also contains a generator and control-and regulating elements, including the elements which serve for rotor pitch angle control.

Finally, the German document DE-PS No. 3,012,069 discloses a support for a rotor in a wind power device in which the rotor is also beared overmounted, and a supporting element is arranged on the rotor. The supporting element merges into a sleeve which surrounds the cylindrical housing of a multi-stage transmission and is supported on the outer surface of the housing of the transmission. The transmission housing is mounted on a basket which carries a generator.

SUMMARY OF THE INVENTION

Accordingly, it is an object of the present invention to provide an wind power device which avoids the disadvantages of the prior art.

More particularly, it is an object of the present invention to provide a wind power device which with a high efficiency and minimum size, improves mounting, loading and maintenance conditions.

In keeping with these objects and with others which will become apparent hereinafter, one feature of the present invention resides, briefly stated, in a wind power device in which a hub of a rotor is formed substantially as a circular ring, rotor blades of the rotor are arranged substantially centrally on the hub, and a hub is supported as considered in an axial direction by the bearing members which are arranged symmetrically on both sides of the rotor blades, on a housing which accommodates both a transmission and a machine for converting wind energy.

The special arrangement of the rotor blades of the hub and its support of the housing avoids the classic form of the overmounted bearing of the rotor. The radial and axial forces which are transmitted by the rotor onto its support can be transmitted with avoiding of local force concentrations to the housing and thereby to the tower. Thereby, the bearing can be designed very lightly with strength considerations. The above mentioned forces are transmitted over large surfaces and particularly on a housing which can be formed in a simple manner with high torsion and bending resistance. The housing can be a cast, welded or forged structure. The assembly of the transmission and machine in a common housing whose outer surface simultaneously serves as a supporting surface for the rotor, brings a very compact construction. Thereby moreover the number of the required individual parts, namely bearings, couplings and the like can be reduced. This feature brings a reduction of maintenance expenses. Because of the space economical construction there is also a possibility for providing the machine and the transmission with a common oil or lubricant supply. Since the inventive construction is not formed by a connection of commercial standard parts, but forms an enclosed operational unit, the mounting can be simplified and moreover the maintenance expenses can be reduced by respective design. The utilization of the outer surface of the housing as a bearing surface is also favorable from manufacturing point of view, since a very accurate mechanical working is possible at this location. Finally, the reduction in the number of the individual parts also leads to a reduction of sources of losses and thereby improvement of the total efficiency.

In accordance with another feature of the present invention, the housing is formed as a rotation-symmetrical part. This is especially advantageous from the point of simple manufacture.

A still further feature of the present invention is that the axial bearing of the hub can functionally be assembled to a unit with both radial bearings. A known technique can be used for this purpose.

Another feature of the present invention is that an axial bearing which is separate from both radial bearings can be provided and brought at any location. The circular ring must be mounted on the hub and cooperate with two circular ring-shaped bodies arranged on the housing and formed with corresponding countersurfaces.

The bearing surfaces of the circular ring can be formed as side surfaces of a toothed rim, whose respective surfaces are located opposite to circular ring-shaped structural elements of the housing. This toothed rim which serves for transmission of rotary movement from the rotor to the transmission, serves simultaneously as an element of the axial bearing. This contributes to general reduction of required structural elements.

A braking device may be arranged between the hub and the housing, which makes the braking device easily accessible and provides for a favorable solution from the maintenance point of view. Alternatively, or in addition to the first braking device, a further braking device can be provided and arranged between the drive shaft of the machine and the housing. It is especially advantageous when the braking device is spring loaded.

Because of the compact construction of the inventive wind power device, the lubricant circulation circuit which covers both the transmission and the machine can be formed in a very simple manner. The lubricant circulation circuit can also include the bearing of the hub on the transmission housing. It is especially advantageous when the circulating lubricant quantity can be controlled in a load-dependent manner.

The wind power device of the invention can be provided with an outer cooling medium circuit, such that the cooling medium takes up the waste heat inside the device and withdraws it via an outer heat exchanger. The waste heat is produced first in the region of lubricating oil, and the "inner" heat exchanger can be formed by for example by a double-wall of the housing, a pipe bundle and the like, for transmitting the heat contained in lubricating oil to a cooling medium. The cooling medium circulating circuit can be driven in a purely convective manner. It is especially advantageous, especially from the point of view of controllability, to provide a special feeding element. For cooling the lubricating oil, also an oil cooler can be used.

The housing can be arranged on a tower bearing via a special matching part which can accommodate the functional elements which require maintenance. The special advantage of this arrangement is that the matching part can be accessible from a position inside the tower which is very important from the point of view of operational safety. The functional elements which require maintenance are for example the central control of a lubricant circulating circuit, controlling and regulating elements of the generator, monitoring and controlling devices of a cooling circulation circuit, controlling and monitoring elements of pressure-actuated braking devices, and respective control elements for pitch control for the blades. Moreover, also elements for dampening torsion vibrations can be accommodated in the matching part, since the housing is subjected to such vibration during its rotation about the axis of the tower support.

The bearing members of the hub can be formed as an integral bearing cooperating with respective countersurfaces of the housing. In this case the hub support is of very short dimension.

The wind power device in accordance with the present invention is therefore a system which is composed of a low number of elements, maintenance-favorable, manufacture- and loading-correct, has small structural volumes, which also provides for a high efficiency because of the lower number of individual parts.

The hub can be also formed as a closed body which surrounds an end region of the housing. In this case only a single seal has to be provided at the end of the hub and the respective relatively movable parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a third embodiment of the circuit; inventive wind power device with an outer cooling medium

DESCRIPTION OF THE PREFERRED EMBODIMENTS

Figure 1:
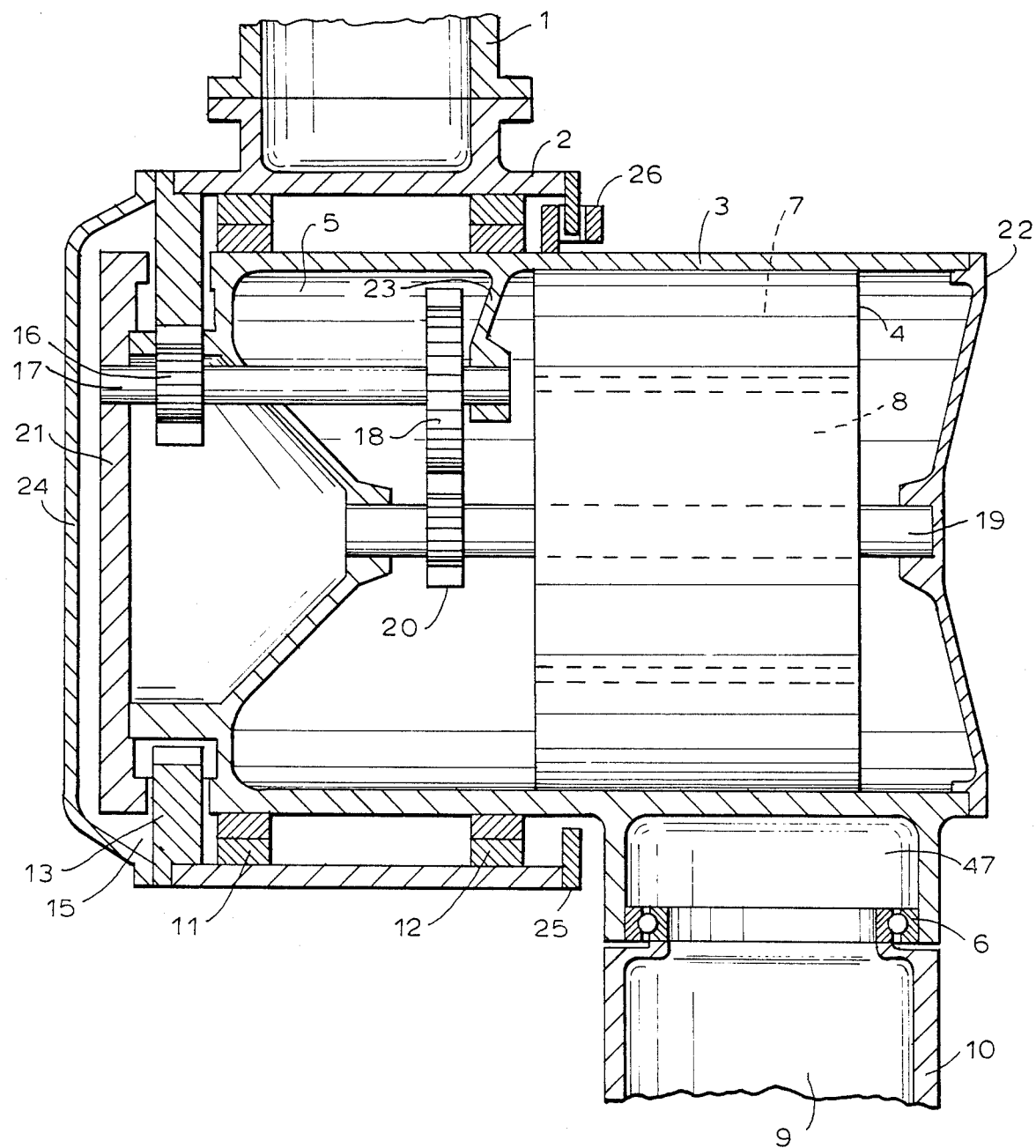
FIG. 1 is a section side view of a first embodiment of the wind power device in accordance with the present invention.

A wind power device shown in FIG. 1 has a rotor which is identified with reference numeral 1 and provided with a hub 2 which is supported on a housing 3. The housing 3 accommodates both a machine 4 to be driven by the wind energy, and a transmission 5. The machine is for example formed as such a machine, by means of which the wind energy is converted into a different form of energy, for example, electrical, hydraulic or pneumatic energy. In correspondence with this, the machine 4 can be formed as an electrical generator, a pump or a compressor. In the shown embodiment the machine 4 is formed as an electrical generator with a stator 7 and a rotor 8 which are shown schematically. The transmission 5 serves for adjusting the number of revolutions of the rotor 1 to the number of revolutions of the machine 4.

The housing 3 as a whole is supported via a schematically shown tower bearing, on an upper end of a tower 10 turnably about a vertical axis 9. The tower bearing 6 takes up both radial and axial forces. The generally known tower bearing or tarret bearing serves for adjusting the wind power device to the respective wind direction, as considered in a horizontal plane. Respective elements which serve for adjusting the above mentioned angular position are not shown in the drawings, for the sake of clarity of the drawings.

Also, electrical conductors and regulating elements which are used for controlling the machine 4 and withdrawing of the produced electrical energy are not shown in the drawings as well.

The housing 3 can be formed in a simple case as a cylindrical element with a longitudinal axis extending in a substantially horizontal direction. The outer surface (respectively worked) of the housing 3 can be directly used as a supporting surface for the hub 2 of the rotor 1.

The bearing of the hub 2 on the outer surface of the housing 3 is performed by two bearing members 11 and 12 which are arranged at a distance from one another and symmetrically at both sides of a plane which includes the rotor 1 or not shown rotor blades. The bearing members 11 and 12 can be formed as sliding (friction) bearings, and also as roller bearings. The bearing members 11 and 12 in the shown embodiment are formed as pure radial bearings.

A toothed rim 13 is arranged on the outer end of the hub 2 which at least partially coaxially surrounds the cylindrical housing 3 as shown in the drawings. The toothed rim 13 extends through an annular slot 14 provided in the wall of the housing 3. The mounting of the toothed rim 13 on the hub 2 is performed in connection with the design of toothed rim walls 15 and the lateral limiting surfaces of the slot 14 so that, axial forces which act on the rotor 1 can be transmitted through the toothed rim walls to the housing 3 and thereby to the foundation of the tower. The axial bearing which is formed by the slot 14 in this manner can also be basically formed as a friction bearing or a roller bearing.

For the sake of clarity of the drawings, the part of the housing 3 in which the slot 14 is provided is shown only schematically, and a showing of all inserts of the housing 3 at this location is dispensed with.

The transmission 5 which is shown only exemplary is formed as a two-stage transmission. Its first stage includes a pinion 16 which is in engagement with the above mentioned rim 13. A toothed wheel 18 is arranged on a shaft 17 which carries a pinion 16 and engages with a further pinion 20 which is directly arranged on a shaft 19 on the generator. While the generator shaft 19 is supported in opposite end walls 21 and 22 of the housing 3, the shaft 17 is supported on the one hand in the end wall 21 and on the other hand in the transverse wall 23 extending radially inside the housing.

A closing part is identified with reference numeral 24. It closes from the hub 2 from outside and overlaps an end wall 21 rotatable therewith.

A braking device is shown schematically and formed in this case as a disc brake. Its braking disc is identified with reference numeral 25, while brake actuating elements are identified with reference numeral 26.

The wind power device is provided with an oil supply element which in accordance with the present invention, together with parts of the control, is accommodated in a matching part 47. The matching part 47 connects the tower bearing 6 with the housing 3. An oil circulation is provided from the oil supplying element and reaches the machine 4, the transmission 5, and the bearing points of the hub 2. The oil cooling is performed basically convectively over the outer surface of the housing 3. Especially advantageous is the arrangement of a separate oil cooler which is incorporated in the above mentioned oil circulation.

From the above presented description it is believed to be clear that the assembly of the transmission 5 and the machine 4 in a joint housing 3 in connection with the bearing of the rotor provided on the outer side of the housing insures a very compact construction. By the symmetrical arrangement of the rotor 1 with respect to the bearing members 11 and 12 in connection with the axial bearing provided through the slot 14, a large-surface distribution of the transmission of radial and axial reaction forces and their transmission to the housing 3 is insured. Thereby local force concentrations connected with respective dimensions of corresponding structural elements are avoided.

Since the bearing of the rotor is arranged in a stress-correct manner, a relatively low loading is produced. With respective properties required from the structural features of the force transmission, it is possible to use this advantage for a lighter construction of the whole system. Since the parts which require maintenance, especially an oil supply element together with control elements are accommodated in the matching part 47, important advantages are achieved for the maintenance. The reason is that a special outer working platform for conducting maintenance works is no longer necessary, since these works can be performed from a position inside the tower and under the tower bearing. In this manner, simultaneously the safety of the maintenance personnel is considerably improved, because such works must be performed in a relatively great height above the ground. When in the wind power device of the present invention the bearing is formed as a friction bearing, a lower noise emission is produced during the operation, also because of the relatively lower number of bearings.

For maintenance expenses it is advantageous that the machine, the transmission and the hub are provided with a common oil circulation, so that otherwise required numerous individual lubrication points are dispensed with.

Figure 2:
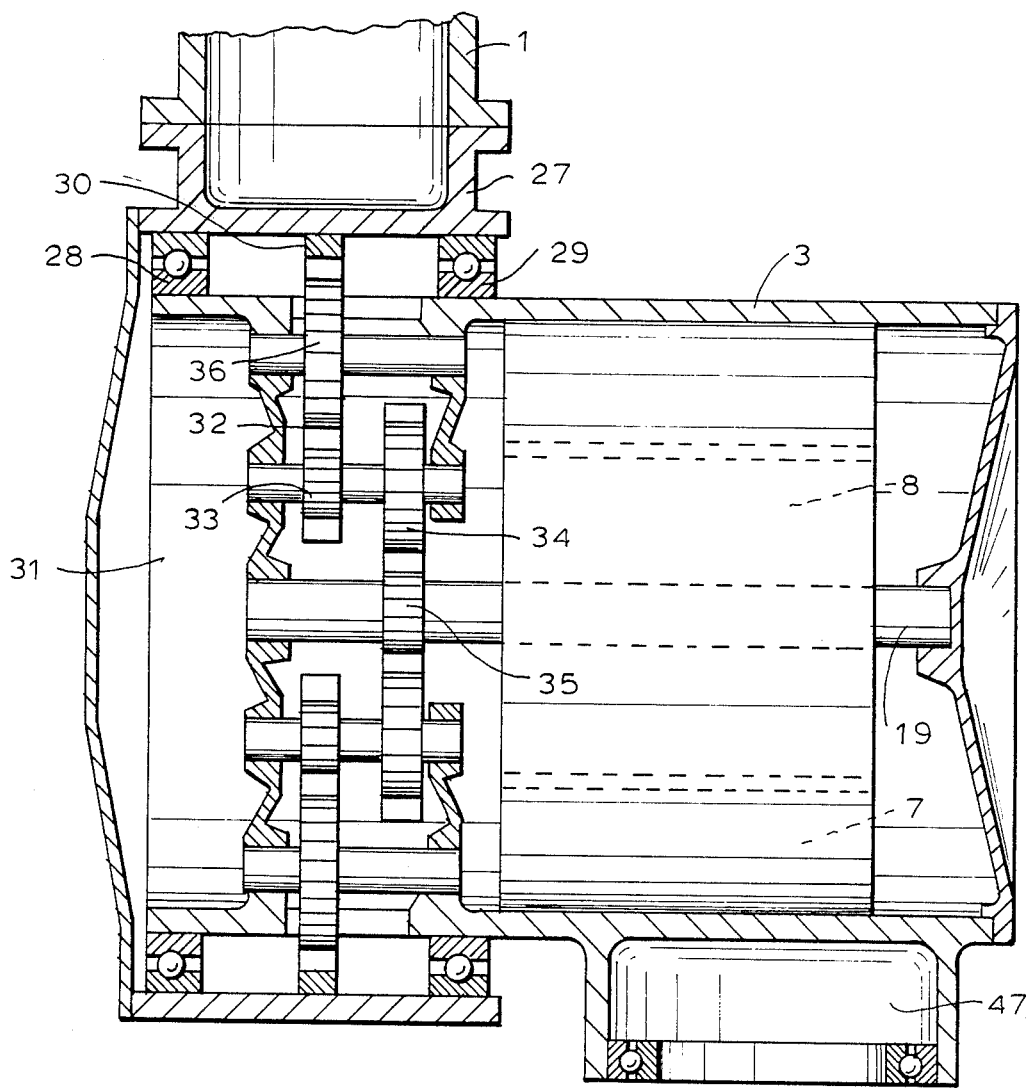
FIG. 2 is a view showing the section side view of a second embodiment of the inventive wind power device.

In FIG. 2 and subsequent Figures, the structural elements which correspond to the elements of FIG. 1 are identified with the same reference numerals in order to avoid the repetition of the description.

The wind power device shown in FIG. 2 differs from the wind power device of FIG. 1 substantially in the construction of the hub 27 and the power transmission from the hub to the generator shaft 19. The hub 27 surrounds here a rotation-symmetrically formed housing 3 and is beared on it by two bearing members 28 and 29 which are spaced from one another. In contrast to the bearing members 11 and 12, one of the bearing members 28 or 29 are formed not only as radial bearings but also simultaneously as axial bearings. The bearing members 28 and 29 are preferably formed as friction bearings, and an axial bearing can be designed in a known manner so that its showing can be dispensed with.

The hub 27 has a center plane which is a plane in which the rotor 1 or the rotor blades are located. In this central plane the hub is provided with a toothed rim 30 which in the shown embodiment is in engagement with a three-stage transmission 31. The transmission includes a first toothed wheel 32 which engages with the toothed rim 30 and simultaneously drives a pinion 32 which has a shaft supporting a second toothed gear 34. The toothed gear 34 engages with the further pinion 35 which is arranged directly on the generator shaft 19. The transmission system which corresponds to the system composed of the toothed gear 32, 34 and the pinion 33, is located inside the housing 3. However, it is offset by 180° as considered in a radial plane, relative to the above described system, and is in engagement with the central pinion 35, on the one hand, and the toothed rim 30 on the other hand. In this manner the moment transmitted from the toothed rim 30 is distributed symmetrically over two transmission points. In contrast to the embodiment of FIG. 1, two gaps 36 are provided in the outer wall of the housing 3 for partial passage of the toothed wheels therethrough.

It can be recognized directly from the geometrical edge condition of the force transmission that in comparison with the embodiment of FIG. 1, the force to be transmitted in the region of the toothed rim with given wind load is lower, while simultaneously a greater transmission ratio is possible. The wind power device of FIG. 2 corresponds in all other aspects to the embodiment of FIG. 1, especially with respect to the central oil supply and the control. Therefore these remaining parts which are comparable with the parts of FIG. 1, are no longer described.

FIG. 3 shows a wind power device with the hub 2 substantially corresponding to the hub of FIG. 1. In deviation from the embodiment of FIG. 1, the bearing member 11 does not form a radial bearing, but instead forms one side of an axial bearing. For this purpose, an outwardly extending bearing ring 37 is provided on the wall of the housing 3. Its one axial countersurface at the side which faces away from the bearing member 11 in an axial direction, is formed by the toothed rim wall 15 of the toothed rim 13, while its other axial countersurface is formed in the region of the bearing member 11.

A structural element which corresponds to the end wall 21 of the embodiment of FIG. 1 is identified in the embodiment of FIG. 3 with reference numeral 38. The hub 2 is closed from outside by a closure part 24 which corresponds to the respective part of FIG. 1.

The transmission 39 includes two pinions which are arranged on both sides of the generator shaft pinion 40. These parts are comparable with the parts of the transmission 5 of the embodiment of FIG. 1. Here also the force transmission from the toothed rim 13 to the transmission is performed at two points for reducing force concentration.

The wall of the housing of the wind power device of FIG. 3 is double-walled. An intermediate chamber 41 formed between two wall portions serves for guiding a cooling medium. Alternatingly, cooling pipes or pipe bundles can be provided along the housing in such form and arrangement that possibly the entire surface of the wall of the housing 3 is overlapped to provide a uniform cooling. Reference numeral 42 identifies a schematically shown cooling medium circulation, in which a heat exchanger 43 is connected. The supply of the cooling medium is performed purely convectively, however, by means of a pump. Waste heat generated in the transmission and generator is transmitted by the cooling medium inside the double-walled housing wall or a respective pipe bundle and subsequently withdrawn from the circulation 42 by means of the heat exchanger 43.

Figure 4:
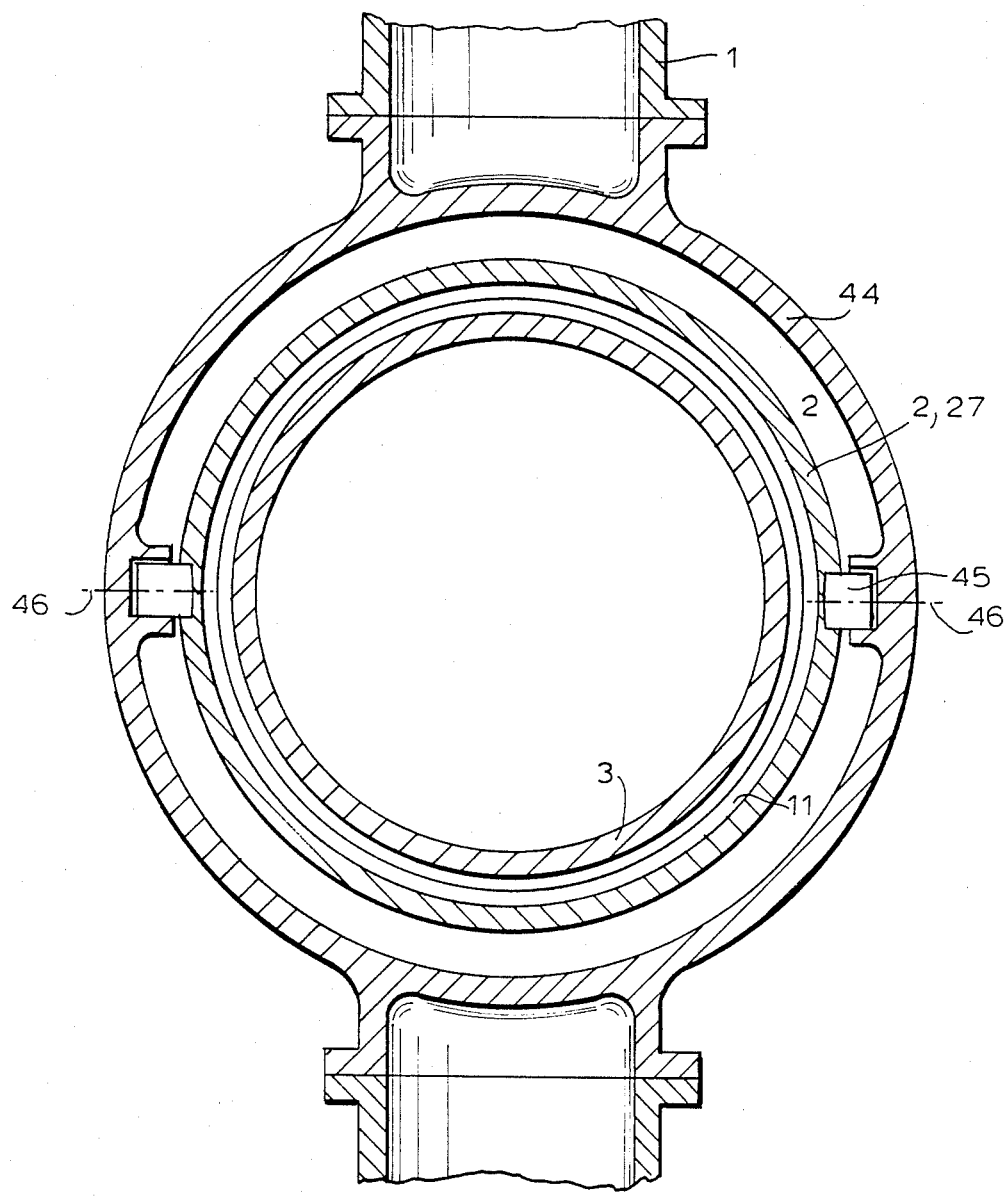
FIG. 4 is a view showing an embodiment of a hub support formed as a swinging hub.

FIG. 4 shows an embodiment with a swinging hub. Here the rotor 1 is formed by a ring 44 which carries at its outer side rotor blades. In this case there are two diametrically opposite rotor blades. The ring 44 is arranged by means of two hinges 45 which are located symmetrical at both sides of a plan of symmetry which contains the rotor blades. The swinging axis of the rotor extends perpendicularly to the axis of the cylindrical housing 3. It is believed to be clear that in this manner the ring 44 with the rotor blades is swingable (turnable) about an axis 46 which is formed by the hinges 45. Advantageously, the hinges (pivots) 45 are arranged in the plane of the rotor vanes, or in other words, in the showing of FIG. 2 centrally between the bearing members 28 and 29.

Figure 5:
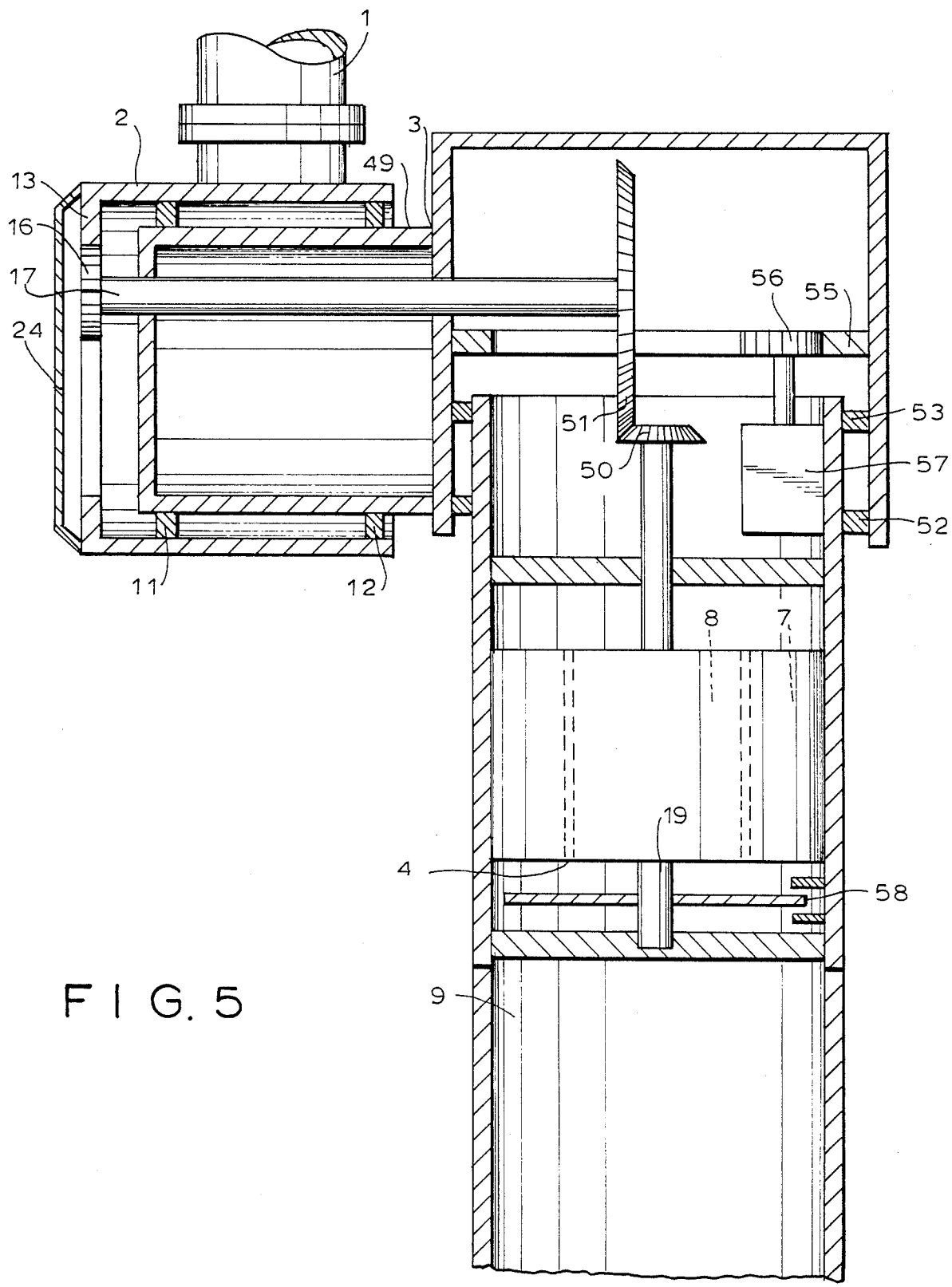
FIG. 5 is a view showing a further embodiment of the inventive wind power device.

FIG. 5 shows a further embodiment of a wind power device of the invention. Here the housing 6 is assembled of two cylindrical housing parts 48 and 49. Their axes intersect one another at an angle of 90° so that the axis of the housing part 48 is perpendicular to the ground. The housing part 49 serves, as in the preceding embodiments, for supporting the hub 2 by the bearing members 11 and 12 which are formed as radial bearings, especially radial friction bearings. The required axial bearing is selectively either assembled with one or both radial bearings, or formed by the toothed rim 13.

The toothed rim 13 engages with the pinion 16 which has the shaft 17 extending into the housing part 48. The shaft 17 is provided at its one end with a bevel gear 50 which engages with a further bevel gear 51 arranged on the generator shaft 19. The latter extends perpendicularly to the shaft 17. In this manner a two-stage transmission is formed. If necessary, further stages can be provided inside the housing part 49. The tower bearing 6 is in this case formed by two bearing members 52 and 53 arranged at a distance from one another. They are located between the outer side of a circularly-cylindrical structural part 54 connected with the tower 10 and the inner side of the housing part 48 at a distance from one another. One of these bearing members 52 and 53 naturally simultaneously forms an axial bearing.

The stator 7 of the machine is in fixed connection with the inner side of the structural part 54 and therefore is arranged stationarily. During swinging movements of the housing 6 about the vertical axis 9, the rotor 8 rotates correspondingly relative to the stator 7.

A further toothed rim is arranged at the inner side of the housing part 48 and engages with a pinion 56. The latter in turn is directly connected with a yaw-gear motor 57. The housing 6 and thereby the rotor can be turned relative to the wind direction about the vertical axis 9 by the motor 57. Reference numeral 58 schematically shows a disc brake with a braking disc arranged on the generator shaft 19. In this inventive construction of a wind power device of FIG. 5, the tower bearing as well as the active yaw system can be provided with a joint oil circulation. There is a further advantage that the electrical conductors connections to the generator can be branched from the stationary stator winding.

By increasing the angle between the axes of the bevel gears 50 and 51 over 90°, the distance between the tips of the rotor blades and the tower can be increased when needed.

Figure 6:
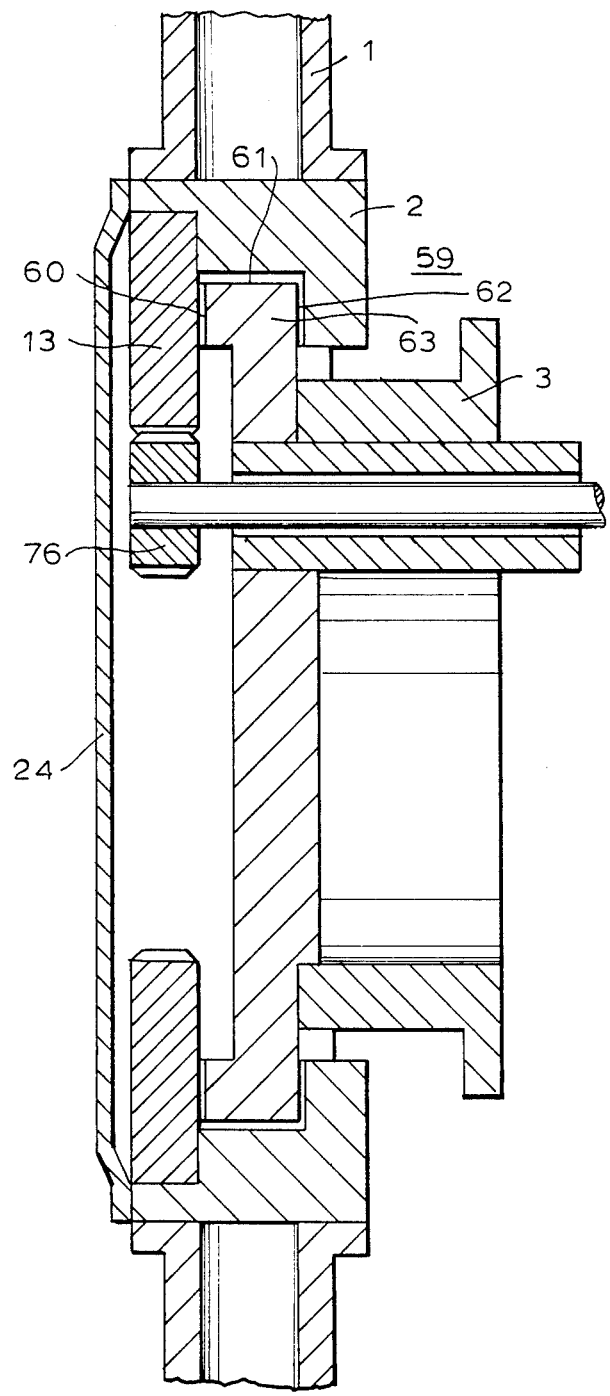
FIG. 6 is a view showing another embodiment of the hub support.

FIG. 6 shows a bearing of the hub 2, in which the bearing members 11 and 12 are assembled to one bearing 59. Such an arrangement is possible since the diameter of the hub is formed great relative to the width of the bearing.

The housing 3 ends in circular ring-shaped part 63. Its circular ring-shaped outer surfaces form countersurfaces 60, 61, 62 of the bearing 59. These countersurfaces 60, 61, 62 cooperate with respectively radially or axially oriented surfaces of the hub 2 or the toothed rim 13 mounted on it.

It will be understood that each of the elements described above, or two or more together, may also find a useful application in other types of constructions differing from the types described above.

While the invention has been illustrated and described as embodied in a wind power device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A wind power device, comprising a rotor having an axis of rotation which lies in a substantially horizontal plane; a machine for converting wind energy; a transmission for transmitting a rotary movement of said rotor to said machine; a tower formed so that said rotor, said transmission and said machine are arranged on said tower rotatably about a substantially vertical axis; a rotation-symmetrical housing accommodating said transmission and said machine, said rotor having a hub which is formed substantially as a circular ring which surrounds and is supported on said rotation-symmetrical housing, said rotor also having a plurality of vanes which are arranged substantially centrally of said hub; and bearing means including at least two bearing members arranged symmetrically at both sides of said rotor vanes as considered in an axial direction and supporting said hub on said housing.

2. A wind power device as defined in claim 1, wherein one of said bearing members is formed as a radial bearing and an axial bearing.

3. A wind power device as defined in claim 2, wherein said axial bearing is formed by a circular ring which is fixedly mounted on said hub, said housing having corresponding countersurfaces with which said circular ring cooperates.

4. A wind power device as defined in claim 3, wherein said circular ring has bearing surfaces which are formed by side surfaces of a toothed rim which has respective surfaces, said housing having circular ring-shaped structural parts located opposite to said respective surfaces of said toothed rim.

5. A wind power device as defined in claim 1, wherein said machine has a drive shaft, said housing and said hub forming a first pair of elements, and said housing and said drive shaft of the machine forming a second pair of elements; and braking means arranged between at least the elements of one of said pair of elements.

6. A wind power device as defined in claim 5; and further comprising braking means arranged between the elements of the other of said pair of elements.

7. A wind power device as defined in claim 5; and further comprising spring means to spring bias said braking means.

8. A wind power device as defined in claim 5; and further comprising a lubricating bath provided for said transmission, said braking means being arranged in said lubricating bath of said transmission.

9. A wind power device as defined in claim 1; and further comprising means for providing a lubricant circulation circuit both for said transmission and said machine.

10. A wind power device as defined in claim 9, wherein said lubricant circulating circuit is formed so that a quantity of lubricant is load-dependent.

11. A wind power device as defined in claim 1, wherein said housing is provided with means for guiding a cooling medium for taking up and withdrawing waste heat of said transmission and said machine; and outer cooling medium circulating circuit associated with said means for guiding the cooling medium and provided with a heat exchanger.

12. A wind power device as defined in claim 11, wherein said means for guiding a cooling medium is formed as a double wall of said housing.

13. A wind power device as defined in claim 11, wherein said means for guiding a cooling medium is formed as a pipe bundle.

14. A wind power device as defined in claim 1; and further comprising a tower support arranged to support a housing for rotation about a substantially vertical axis; matching part formed so that said housing is supported on said tower support through said matching part; and functional elements which require maintenance and are accommodated in said matching part.

15. A wind power device as defined in claim 1, wherein said hub has a hub axis and is formed as a swinging hub with a pivot axis extending perpendicularly to said hub axis, said swinging hub being arranged centrally between said two bearing members.

16. A wind power device as defined in claim 15; and further comprising means which form said pivot axis and include two hinges, said rotor being formed as a ring which carries said rotor blades and is connected with said hub via said hinges.

17. A wind power device as defined in claim 1, wherein said housing has an end region, said hub being formed as a closed body which surrounds said end region of said housing.

18. A wind power device as defined in claim 1, wherein said machine has a stator which is stationary, said housing being turnable about said stator relative to a vertical axis.

19. A wind power device as defined in claim 1, wherein said bearing members of said hub is formed as an integral bearing, said housing having countersurfaces with which said integral bearing cooperates.

20. A wind power device as defined in claim 4, wherein said toothed rim is mounted on said hub.

* * * * *